(12) United States Patent
Guo et al.

(10) Patent No.: US 12,536,434 B2
(45) Date of Patent: Jan. 27, 2026

(54) COMPUTING METHOD AND APPARATUS FOR CONVOLUTIONAL NEURAL NETWORK MODEL

(71) Applicant: Inspur Electronic Information Industry Co., Ltd., Jinan (CN)

(72) Inventors: Zhenhua Guo, Jinan (CN); Baoyu Fan, Jinan (CN); Li Wang, Jinan (CN); Kai Gao, Jinan (CN)

(73) Assignee: INSPUR ELECTRONIC INFORMATION INDUSTRY CO., LTD., Jinan (CN)

( * ) Notice: Subject to any disclaimer, the term of this patent is extended or adjusted under 35 U.S.C. 154(b) by 974 days.

(21) Appl. No.: 17/765,322

(22) PCT Filed: Nov. 27, 2019

(86) PCT No.: PCT/CN2019/121104
§ 371 (c)(1),
(2) Date: Mar. 30, 2022

(87) PCT Pub. No.: WO2021/077533
PCT Pub. Date: Apr. 29, 2021

(65) Prior Publication Data
US 2022/0343166 A1   Oct. 27, 2022

(30) Foreign Application Priority Data
Oct. 25, 2019 (CN) .......................... 201911022124.9

(51) Int. Cl.
*G06N 3/08* (2023.01)
*G06F 7/544* (2006.01)
(52) U.S. Cl.
CPC ............. *G06N 3/08* (2013.01); *G06F 7/5443* (2013.01)

(58) Field of Classification Search
CPC .......... G06N 3/08; G06F 7/5443; G06F 9/46; G06F 9/50
See application file for complete search history.

(56) References Cited

U.S. PATENT DOCUMENTS

| 10,019,668 B1 * | 7/2018 | Woo | ....................... G06N 3/042 |
| 11,599,798 B2 * | 3/2023 | Hu | ........................ G06N 3/063 |

(Continued)

FOREIGN PATENT DOCUMENTS

| CN | 104978601 | 10/2015 |
| CN | 105630882 | 6/2016 |
| CN | 110210378 | 9/2019 |

OTHER PUBLICATIONS

Lu, et al. (Nov. 14, 2018) "Tetris: Re-architecting Convolutional Neural Network Computation for Machine Learning Accelerators," arXiv.1811.06841v1 (Year: 2018).*

(Continued)

*Primary Examiner* — Abdullah Al Kawsar
(74) *Attorney, Agent, or Firm* — Maschoff Brennan

(57) ABSTRACT

A computing method and apparatus for a convolutional neural network model. The method comprises: acquiring a computing model of a training task of a convolutional neural network model (S101); then splitting multiply-accumulate operation in a computing model of a training task of the convolutional neural network model into a plurality of multiply-add operation tasks (S102); confirming a computing device corresponding to each multiply-add operation task according to the correlation between a preset computing model and the computing device (S103); and finally, respectively computing each multiply-add operation task by utilizing the computing device corresponding to each multiply-add operation task (S104). The purposes of improving the flexibility of migration of a CNN model training task on (Continued)

Acquiring a training task of a convolutional neural network model — S201

Processing the training task of a convolutional neural network model by utilizing a deep learning framework to generate a data flow diagram — S202 different computing devices or cooperative computing of different processors and improving the computing speed are achieved.

6 Claims, 4 Drawing Sheets

(56) References Cited

U.S. PATENT DOCUMENTS

| | | | |
|---|---|---|---|
| 2016/0321777 A1 | 11/2016 | Jin et al. | |
| 2018/0307495 A1* | 10/2018 | Ould-Ahmed-Vall | ........................ G06F 9/3887 |
| 2018/0322606 A1 | 11/2018 | Das et al. | |
| 2019/0138891 A1 | 5/2019 | Kim et al. | |
| 2021/0350214 A1* | 11/2021 | Li | ........................ G06F 17/16 |
| 2022/0391665 A1* | 12/2022 | Zhang | ........................ G06N 3/063 |

OTHER PUBLICATIONS

Xu, et al. (Jul. 23, 2018) "DeltaRNN: A Power-efficient Recurrent Neural Network Accelerator" ISLPED '18: Proceedings of the International Symposium on Low Power Electronics and Design, Article No. 37, p. 1-6 (Year: 2018).*
European Patent Office, Extended European Search Report, Mar. 11, 2022, pp. 1-11
China National Intellectual Property Administration, International Search Report, PCT/CN2019/121104, Jul. 27, 2020, pp. 1-6.
Patent Cooperation Treaty, Written Opinion of the International Searching Authority, PCT/CN2019/121104, Jul. 27, 2020, pp. 1-7.

* cited by examiner

COMPUTING METHOD AND APPARATUS FOR CONVOLUTIONAL NEURAL NETWORK MODEL

The present application claims the priority of the Chinese patent application filed with the Chinese Patent Office on Oct. 25, 2019 with the application number of 201911022124.9 and entitled "Computing Method and Apparatus for Convolutional Neural Network Model", the contents of which are incorporated herein in its entirety by reference.

TECHNICAL FIELD

The present invention relates to the technical field of computers, in particular to a computing method and apparatus for a convolutional neural network model.

BACKGROUND ART

With continuous development of computer technology and artificial intelligence technology, convolutional neural network (CNN) models are more and more widely used, and with an increasing demand for the accuracy of CNN models in the process of target detection and recognition, the size of CNN models is also growing, therefore a hardware platform used for CNN model training tasks is increasingly demanding. However, with the limitation of Moore's law, the hardware platform for CNN training tasks in the prior art is gradually reaching a bottleneck.

Therefore, in the industry, other heterogeneous devices are adopted for heterogeneous acceleration of CNN model training tasks; however, computing devices including CPUs, GPUs, FPGAs, and AI-specific processors in the prior art all have dedicated and customized computing execution granularity when performing CNN model training computing tasks. When CNN model training tasks are migrated on different computing devices or co-computed by different processors, it is very inflexible and seriously affects the computing speed.

SUMMARY OF THE INVENTION

In view of this, embodiments of the present invention provide a computing method and apparatus for a convolutional neural network model, for improving the flexibility of migration of a CNN model training task on different computing devices or cooperative computing of different processors and improving the computing speed.

To achieve the above objective, embodiments of the present invention provide the following technical solution:
a computing method of a convolutional neural network model includes:
acquiring a computing model of a training task of a convolutional neural network model;
splitting the multiply-accumulate operation in the computing model of the training task of the convolutional neural network model into a plurality of multiply-add operation tasks;
identifying a computing device corresponding to each multiply-add operation task according to a corresponding relationship between a preset computing model and a computing device; and
performing computation on each multiply-add operation task respectively by utilizing the computing device corresponding to each multiply-add operation task.

Optionally, the acquiring a computing model of a training task of a convolutional neural network model includes:
acquiring a training task of a convolutional neural network model; and
processing the training task of a convolutional neural network model by utilizing a deep learning framework to generate a data flow diagram, wherein the data flow diagram is taken as a computing model of a training task of the convolutional neural network model.

Optionally, the splitting the multiply-accumulate operation in the computing model of the training task of the convolutional neural network model into a plurality of multiply-add operation tasks includes:
splitting the multiply-accumulate operation in a computing model of a training task of the convolutional neural network model into a first-place multiply-add operation task, an intermediate multiply-add operation task, and a last-place multiply-add operation task; wherein the first-place multiply-add operation task includes a multiplication computation during forward propagation computation and includes a multiplication computation and an addition computation during backward propagation computation; the intermediate multiply-add operation task includes a multiplication computation and an addition computation; and the last-place multiply-add operation task includes a multiplication computation and an addition computation during forward propagation computation and includes a multiplication computation during backward propagation computation.

Optionally, the performing computation on each multiply-add operation task respectively by utilizing the computing device corresponding to each multiply-add operation task further includes:
judging if a current load rate of a computing device corresponding to the multiply-add operation task is greater than a load rate threshold corresponding to a computing device corresponding to the multiply-add operation task; and
calling a currently available computing device to compute the multiply-add operation task if the current load rate of a computing device corresponding to the multiply-add operation task is greater than the load rate threshold corresponding to a computing device corresponding to the multiply-add operation task.

Optionally, the method further includes the following step after splitting the multiply-accumulate operation in the computing model of the training task of the convolutional neural network model into a plurality of multiply-add operation tasks:
adding an identifier to each multiply-add operation task, wherein the identifier is configured to mark the position of each multiply-add operation task in the computing model of the training task of the convolutional neural network model.

A computing device of a convolutional neural network model, including:
an acquisition unit, configured to acquire a computing model of a training task of a convolutional neural network model;
a splitting unit, configured to split the multiply-accumulate operation in the computing model of the training task of the convolutional neural network model into a plurality of multiply-add operation tasks;
an identifying unit, configured to identify a computing device corresponding to each multiply-add operation task according to a corresponding relationship between a preset computing model and a computing device; and a computing unit, configured to perform computation on each multiply-add operation task respectively by utilizing the computing device corresponding to each multiply-add operation task.

Optionally, the acquisition unit includes:

an acquisition sub-unit, configured to acquire a training task of a convolutional neural network model; and a generation unit, configured to process the training task of a convolutional neural network model by utilizing a deep learning framework to generate a data flow diagram, wherein the data flow diagram is taken as a computing model of a training task of the convolutional neural network model.

Optionally, the splitting unit includes:

a splitting sub-unit, configured to split the multiply-accumulate operation in a computing model of a training task of the convolutional neural network model into a first-place multiply-add operation task, an intermediate multiply-add operation task, and a last-place multiply-add operation task; wherein the first-place multiply-add operation task includes a multiplication computation during forward propagation computation and includes a multiplication computation and an addition computation during backward propagation computation; the intermediate multiply-add operation task includes a multiplication computation and an addition computation; and the last-place multiply-add operation task includes a multiplication computation and an addition computation during forward propagation computation and includes a multiplication computation during backward propagation computation.

Optionally, the computing device of the convolutional neural network model further includes:

a judgment unit, configured to judge whether a current load rate of a computing device corresponding to the multiply-add operation task is greater than a load rate threshold corresponding to a computing device corresponding to the multiply-add operation task; and a calling unit, configured to call a currently available computing device to compute the multiply-add operation task if the judgment unit judges that the current load rate of a computing device corresponding to the multiply-add operation task is greater than the load rate threshold corresponding to a computing device corresponding to the multiply-add operation task.

Optionally, the computing device of the convolutional neural network model further includes:

an addition unit, configured to add an identifier to each multiply-add operation task, wherein the identifier is configured to mark the position of each multiply-add operation task in the computing model of the training task of the convolutional neural network model.

It may be known from the above solution that, in the computing method and apparatus for a convolutional neural network model provided in the present invention, a computing model of a training task of a convolutional neural network model is acquired, then the multiply-accumulate operation in the computing model of the training task of the convolutional neural network model is split into a plurality of multiply-add operation tasks, a computing device corresponding to each multiply-add operation task is identified according to a corresponding relationship between a preset computing model and a computing device, and finally computation is performed on each multiply-add operation task respectively by utilizing the computing device corresponding to each multiply-add operation task. The purposes of improving the flexibility of migration of a CNN model training task on different computing devices or cooperative computing of different processors and improving the computing speed are achieved.

The above description is merely a summary of the technical solution of the present invention, which can be implemented according to the contents of the specification in order to more clearly understand the technical means of the present invention, moreover, in order to make the above and other objects, features and advantages of the present invention more obvious and understandable, specific execution modes of the present invention are specifically enumerated below.

BRIEF DESCRIPTION OF THE DRAWINGS

Through reading detailed description of the preferred execution modes below, various other advantages and benefits will become clear for those skilled in the art. The accompanying drawings are merely used for the purpose of illustrating the preferred execution modes, rather than being considered to be a limitation of the present invention. Moreover, throughout the accompanying drawings, the same reference numerals represent the same parts. In the accompanying drawings.

DETAILED DESCRIPTION OF THE EMBODIMENTS

Exemplary embodiments of the present disclosure will be described in greater details below with reference to the accompanying drawings. Although exemplary embodiments of the present disclosure are shown in the accompanying drawings, however, it should be understood that the present disclosure can be implemented in various forms, and should not be limited by the embodiments set forth herein. In contrary, these embodiments are provided to allow for a more thorough understanding of the present disclosure and to enable the scope of the present disclosure to be completely communicated to those skilled in the art.

Currently, with the development of super-heterogeneous computing platforms that mix different computing devices, the complexity of software systems supporting super-heterogeneous computation becomes higher and higher. For example, when a CPU executes a CNN model training task by using an instruction set, the parallel granularity of the CNN model training task is an instruction set supported by the CPU; when the CNN model training task runs on a GPU, the parallel granularity is Tensor Core and CUDA Core on the GPU, by dividing the CNN model training task into different threads, each thread task may be assigned to run on different Cores; when running the CNN model training task on an FPGA, a programmable control logic of the FPGA allows for parallelism at the gate level circuit granularity; while when running on an AI-specific processor, the CNN model training task needs to be split into smallest granular units designed on the AI-specific processor, such as coarse-grained complex instruction sets, convolutional kernels and other customized units.

It may be observed that, when CNN model training tasks are designed and implemented on different computing devices, the design solution of CNN model training tasks needs to be optimized for different computing devices. If the CNN model training task needs to be deployed on super-heterogeneous computing platforms, and the same model needs to run on different computing devices, more complex customized implementation solutions of the CNN model training tasks need to be designed.

Figure 1:
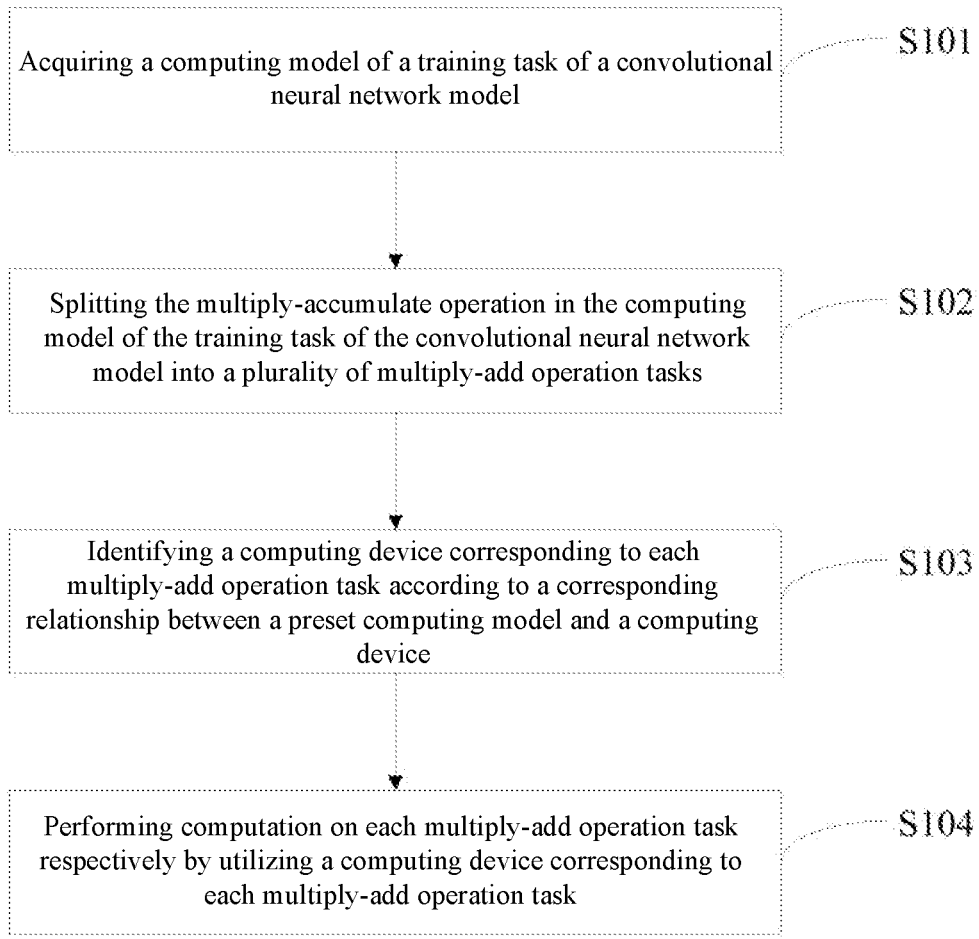
FIG. 1 is a specific flow diagram of a computing method of a convolutional neural network model provided in an embodiment of the present invention.

Therefore, the computing method of a convolutional neural network model provided in an embodiment of the present invention is used for improving the flexibility of migration of a CNN model training task on different computing devices or cooperative computing of different processors and improving the computing speed, as shown in FIG. 1, the following steps are included:

S101, acquiring a computing model of a training task of a convolutional neural network model.

Wherein, the current convolutional neural network (CNN) model is usually dominated by convolution operations. The training task in the convolutional neural network model is usually to perform multiply-accumulate operation on each layer in the CNN model; and the multiply-accumulate operation refers to multiple multiplication operations and a concatenation operation.

Figure 2:
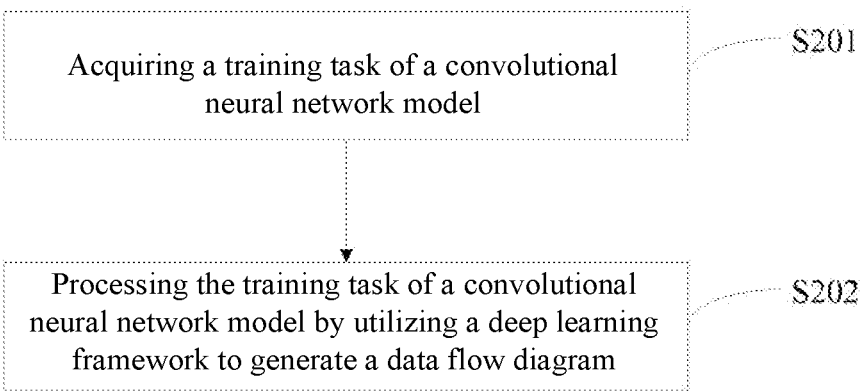
FIG. 2 is a specific flow diagram of a computing method of a convolutional neural network model provided in another embodiment of the present invention.

Optionally, in another embodiment of the present invention, as shown in FIG. 2, one execution mode of step S101 includes the following steps:

S201, acquiring a training task of a convolutional neural network model.

Figure 3:
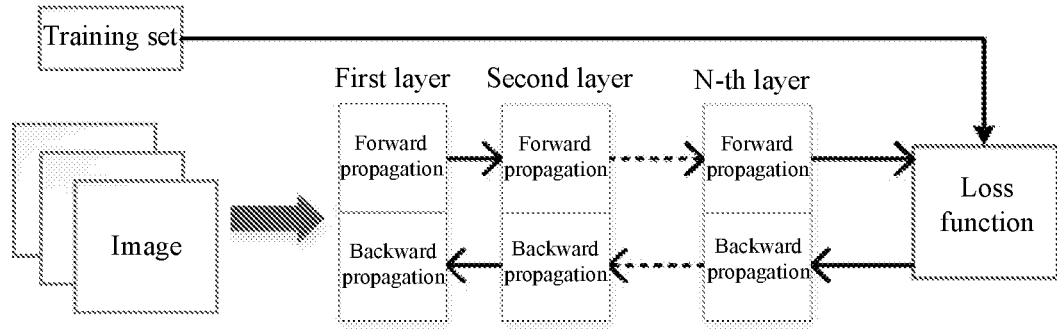
FIG. 3 is a schematic diagram of a training task of a convolutional neural network model provided in another embodiment of the present invention.

Wherein, as shown in FIG. 3, a training task of the existing convolutional neural network model generally includes two computing processes including forward propagation (FP) computation and back propagation (BP) computation; a loss function in FIG. 3 is a loss function generally used during CNN model training; the loss function is generally used to evaluate whether parameters in a model are good or bad. The main purpose of CNN model training is to find a batch of reasonable parameters, such that the value of the loss function is optimized, forward propagation is to compute based on the input image data and initialized parameters of the model, to obtain the result of the loss function, while as to the backward computation, gradient computation is performed on parameters according to evaluation results of the loss function, to converge to obtain a better parameter to make the result of the loss function more favorable.

S202, processing the training task of a convolutional neural network model by utilizing a deep learning framework to generate a data flow diagram.

Wherein, the data flow diagram is taken as a computing model of a training task of the convolutional neural network model; while the deep learning framework may be the existing deep learning frameworks, such as Tensorflow, Pytorch, PaddlePaddle, etc.

Figure 4:
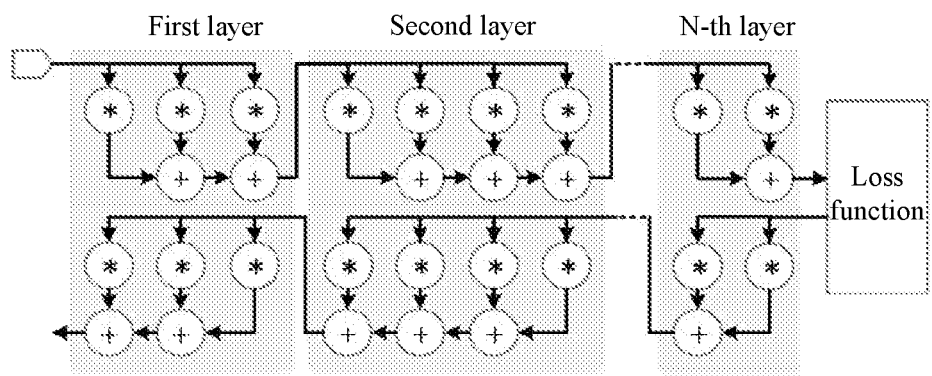
FIG. 4 is a data flow diagram generated when a training task of a convolutional neural network model is processed through an existing deep learning framework provided by another embodiment of the present invention.

In this step, the training task of the convolutional neural network model may be processed by the existing deep learning framework, to generate the data flow diagram (Directed Acyclic Graph, DAG) shown in FIG. 4. It should be noted that the DAG is a representation form of the CNN model generally used in the existing deep learning framework. Wherein, multiple multiply-accumulate operation tasks may be included in the DAG, such as in FIG. 4, the tasks in the first layer, the tasks in the second layer, and the tasks in the N-th layer.

It should be noted that, as shown in FIG. 4, the multiply-accumulate operation tasks, such as the task in the first layer, the task in the second layer, and the task in the N-th layer, represent forward propagation computation before being computed through a loss function, and the task in the first layer, the task in the second layer, and the task in the N-th layer represent backward propagation computation after being computed through a loss function.

S102, splitting the multiply-accumulate operation in the computing model of the training task of the convolutional neural network model into a plurality of multiply-add operation tasks.

In this step, in the process of splitting the multiply-accumulate operation in the computing model of the training task of the convolutional neural network model into a plurality of multiply-add operation tasks, a software implementation manner may be adopted to perform DAG automatic transformation of a CNN model, through an analysis on the data flow diagram of the CNN model, the multiply-accumulate operation is automatically transformed into a multiply-add operation.

Optionally, in another embodiment of the present invention, an execution mode of step S102 includes the following steps:

splitting the multiply-accumulate operation in a computing model of a training task of the convolutional neural network model into a first-place multiply-add operation task, an intermediate multiply-add operation task, and a last-place multiply-add operation task.

Wherein, the first-place multiply-add operation task includes a multiplication computation during forward propagation computation and includes a multiplication computation and an addition computation during backward propagation computation; the intermediate multiply-add operation task includes a multiplication computation and an addition computation; and the last-place multiply-add operation task includes a multiplication computation and an addition computation during forward propagation computation and includes a multiplication computation during backward propagation computation.

It should be noted that, the multiply-accumulate operation in a computing model of a training task of a convolutional neural network model may be a combination of a plurality of multiply-accumulate operations.

Figure 5:
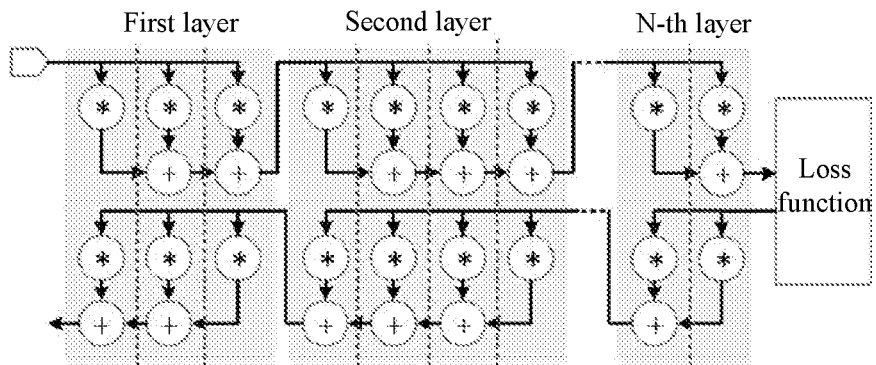
FIG. 5 is a schematic diagram showing that a multiply-accumulate operation in a computing model of a training task of the convolutional neural network model is split into a first-place multiply-add operation task, an intermediate multiply-add operation task, and a last-place multiply-add operation task provided in another embodiment of the present invention.

Specifically, as shown by the task in the first layer in FIG. 5, the task in the first layer may be split into three multiply-add operation tasks according to a dotted line, and the three multiply-add operation tasks may be the above first-place multiply-add operation task, the intermediate multiply-add operation task, and the last-place multiply-add operation task in sequence from left to right; it should be noted that, when each multiply-accumulate operation is split into a plurality of multiply-add operation tasks, at least one first-place multiply-add operation task and one last-place multiply-add operation task are respectively required, while the intermediate multiply-add operation task may be shown by one intermediate multiply-add operation task in the task in the first layer, may also be shown by a plurality of intermediate multiply-add operation tasks in the task of the second layer, and may also be shown by the task in the N-th layer, no intermediate multiply-add operation task is required, the form of splitting may be according to different multiply-add operation tasks for different splitting, which will not be repeated redundantly herein.

In this step, a multiply-accumulate operation in a computing model of a training task of the convolutional neural network model is split into a first-place multiply-add operation task, an intermediate multiply-add operation task, and a last-place multiply-add operation task, a software algorithm manner may also be adopted, to split the multiply-accumulate operation in a computing model of a training task of the convolutional neural network model into the above three multiply-add operation tasks.

Optionally, in another embodiment of the present invention, in an execution mode after step S102, the following steps may also be included:

adding an identifier to each multiply-add operation task.

Wherein, the identifier is configured to mark the position of each multiply-add operation task in the computing model of the training task of the convolutional neural network model.

It should be noted that, since the computing results need to be recalculated after each multiply-add operation is completed for subsequent data analysis, therefore, after the multiply-accumulate operation in a computing model of a training task of the convolutional neural network model is split into a plurality of multiply-add operation tasks, an identifier may be added to each multiply-add operation task, thereby facilitating recalculation of the computing results subsequently.

S103, identifying a computing device corresponding to each multiply-add operation task according to a corresponding relationship between a preset computing model and a computing device.

Wherein the preset corresponding relationship between the computing model and the computing device may be preset according to specifically customized computation implementation granularity of the existing computing device such as a CPU, a GPU, an FPGA, an AI-specific processor, and may also be modified according to subsequent computing requirements, the designing methods are flexible and variable, which is not defined herein.

It should be noted that, by default, after the multiply-accumulate operation task is split into a plurality of multiply-add operation tasks, the corresponding computing device will not change, but may be flexibly scheduled according to actual conditions.

S104, performing computation on each multiply-add operation task respectively by utilizing the computing device corresponding to each multiply-add operation task.

Figure 6:
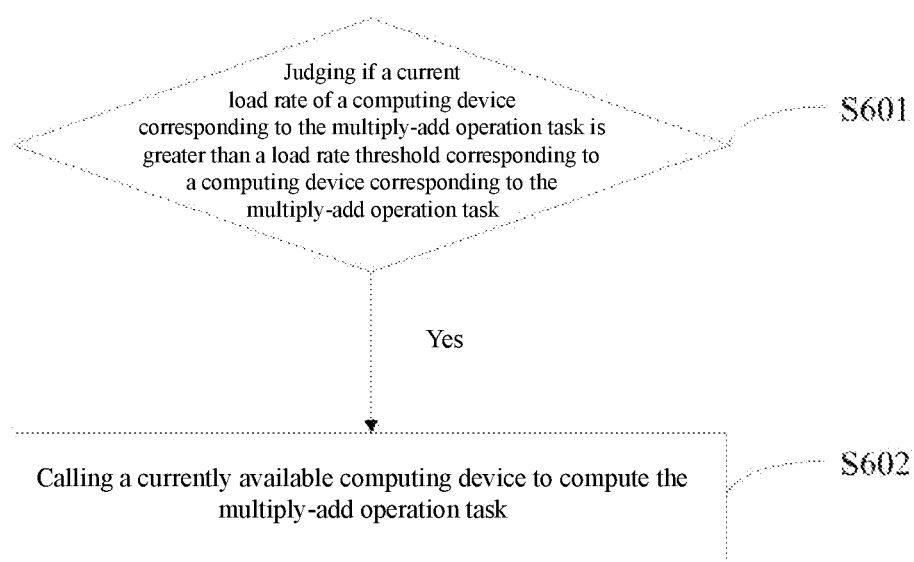
FIG. 6 is a specific flow diagram of a computing method of a convolutional neural network model provided in another embodiment of the present invention.

Optionally, in another embodiment of the present invention, in specific implementation process of step S104, as shown in FIG. 6, the following steps may also be included:

S601, judging if a current load rate of a computing device corresponding to the multiply-add operation task is greater than a load rate threshold corresponding to a computing device corresponding to the multiply-add operation task.

Specifically, if the current load rate of a computing device corresponding to the multiply-add operation task is greater than the load rate threshold corresponding to a computing device corresponding to the multiply-add operation task, then step S602 is performed; if judging that the current load rate of a computing device corresponding to the multiply-add operation task is less than or equal to the load rate threshold corresponding to a computing device corresponding to the multiply-add operation task, then continuing to use the computing device corresponding to the multiply-add operation task for computation.

S602, calling a currently available computing device to compute the multiply-add operation task.

It may be known from the above solution that, in the computing method of a convolutional neural network model provided in the present invention, a computing model of a training task of a convolutional neural network model is acquired, then the multiply-accumulate operation in the computing model of the training task of the convolutional neural network model is split into a plurality of multiply-add operation tasks, a computing device corresponding to each multiply-add operation task is identified according to a corresponding relationship between a preset computing model and a computing device, and finally computation is performed on each multiply-add operation task respectively by utilizing the computing device corresponding to each multiply-add operation task. The purposes of improving the flexibility of migration of a CNN model training task on different computing devices or cooperative computing of different processors and improving the computing speed are achieved.

Figure 7:
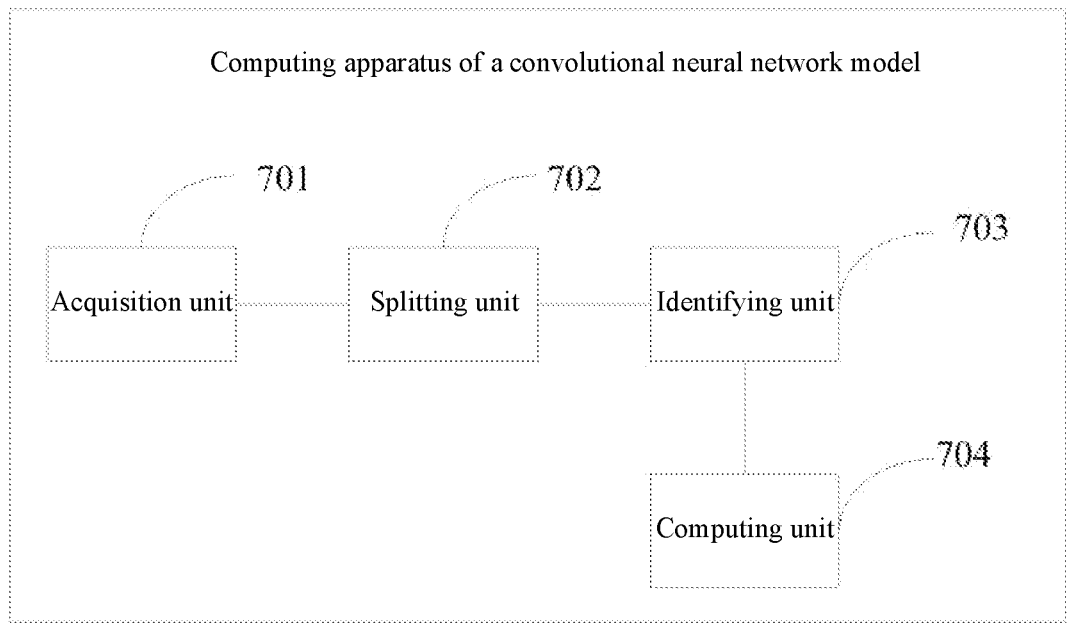
FIG. 7 is a schematic diagram of a computing device of a convolutional neural network model provided in another embodiment of the present invention.

Embodiments of the present invention provide a computing device of a convolutional neural network model, as shown in FIG. 7, the computing device includes:

an acquisition unit 701, configured to acquire a computing model of a training task of a convolutional neural network model.

Figure 8:
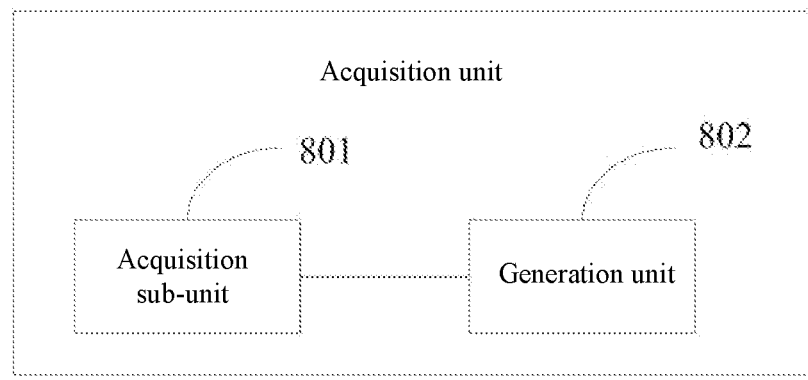
FIG. 8 is a schematic diagram of a computing device of a convolutional neural network model provided in another embodiment of the present invention.

Optionally, in another embodiment of the present invention, as shown in FIG. 8, an exaction mode of the acquisition unit 701 includes:

an acquisition sub-unit 801, configured to acquire a training task of a convolutional neural network model; and a generation unit 802, configured to process the training task of a convolutional neural network model by utilizing a deep learning framework to generate a data flow diagram.

Wherein the data flow diagram is taken as a computing model of a training task of the convolutional neural network model.

As shown in FIG. 2, for specific working process of the unit disclosed in the above embodiment of the present invention, please refer to the content of the corresponding method embodiment, which will not be repeated redundantly herein.

A splitting unit 702 is configured to split the multiply-accumulate operation in the computing model of the training task of the convolutional neural network model into a plurality of multiply-add operation tasks.

Optionally, in another embodiment of the present invention, an execution mode of the splitting unit 702 includes:

a splitting sub-unit, configured to split the multiply-accumulate operation in a computing model of a training task of the convolutional neural network model into a first-place multiply-add operation task, an intermediate multiply-add operation task, and a last-place multiply-add operation task.

Wherein the first-place multiply-add operation task includes a multiplication computation during forward propagation computation and includes a multiplication computation and an addition computation during backward propagation computation; the intermediate multiply-add operation task includes a multiplication computation and an addition computation; and the last-place multiply-add operation task includes a multiplication computation and an addition computation during forward propagation computation and includes a multiplication computation during backward propagation computation.

For specific working process of the unit disclosed in the above embodiment of the present invention, please refer to the content of the corresponding method embodiment, which will not be repeated redundantly herein.

Optionally, in another embodiment of the present invention, an execution mode of the splitting unit 702 further includes:

an addition unit, configured to add an identifier to each multiply-add operation task.

Wherein the identifier is configured to mark the position of each multiply-add operation task in the computing model of the training task of the convolutional neural network model.

For specific working process of the unit disclosed in the above embodiment of the present invention, please refer to the content of the corresponding method embodiment, which will not be repeated redundantly herein.

An identifying unit 703 is configured to identify a computing device corresponding to each multiply-add operation task according to a corresponding relationship between a preset computing model and a computing device.

A computing unit 704 is configured to perform computation on each multiply-add operation task respectively by utilizing the computing device corresponding to each multiply-add operation task.

As shown in FIG. 1, for specific working process of the unit disclosed in the above embodiment of the present invention, please refer to the content of the corresponding method embodiment, which will not be repeated redundantly herein.

Figure 9:
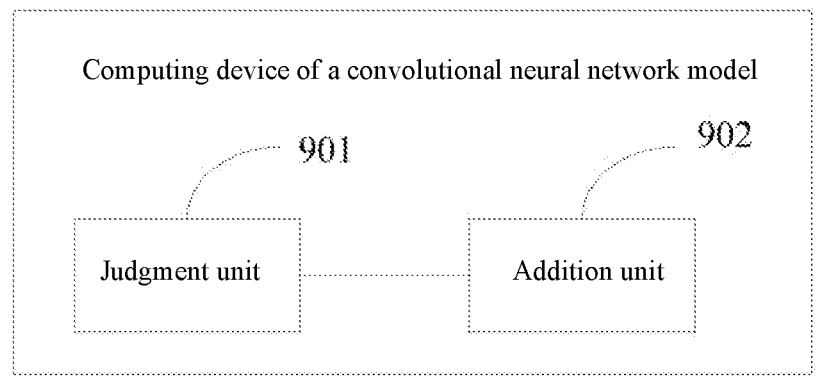
FIG. 9 is a schematic diagram of a computing device of a convolutional neural network model provided in another embodiment of the present invention.

Optionally, in another embodiment of the present invention, as shown in FIG. 9, an exaction mode of the computing device of a convolutional neural network model further includes:

a judgment unit 901, configured to judge whether a current load rate of a computing device corresponding to the multiply-add operation task is greater than a load rate threshold corresponding to a computing device corresponding to the multiply-add operation task; and a calling unit 902, configured to call a currently available computing device to compute the multiply-add operation task if the judgment unit 901 judges that the current load rate of a computing device corresponding to the multiply-add operation task is greater than the load rate threshold corresponding to a computing device corresponding to the multiply-add operation task.

As shown in FIG. 6, for specific working process of the unit disclosed in the above embodiment of the present invention, please refer to the content of the corresponding method embodiment, which will not be repeated redundantly herein.

It may be known from the above solution that, in the computing device of a convolutional neural network model provided in the present invention, a computing model of a training task of a convolutional neural network model is acquired through an acquisition unit 701, then the multiply-accumulate operation in the computing model of the training task of the convolutional neural network model is split into a plurality of multiply-add operation tasks by a splitting unit 702, a computing device corresponding to each multiply-add operation task is identified by an identifying unit 703 according to a corresponding relationship between a preset computing model and a computing device, and finally computation is performed on each multiply-add operation task respectively through a computing unit 704 by utilizing the computing device corresponding to each multiply-add operation task. The purposes of improving the flexibility of migration of a CNN model training task on different computing devices or cooperative computing of different processors and improving the computing speed are achieved.

It should also be noted that, the terms "include", "comprise" or any other variant thereof are intended to cover non-exclusive inclusions, such that a process, method, commodity or device including a series of elements includes not only those elements, but also other elements not explicitly listed, or further includes elements that are also inherent to such process, method, commodity or device. Without further limitation, an element defined by the statement "including a . . . " does not preclude the existence of additional identical elements in the process, method, commodity, or device that includes the element.

Those skilled in the art shall appreciate that the embodiments of the present application can be embodied as a method, a system or a computer program product. Therefore, the present application can be embodied in the form of an all-hardware embodiment, an all-software embodiment or an embodiment of software and hardware in combination. Furthermore, the present application can be embodied in the form of a computer program product embodied in one or more computer useable storage mediums (including but not limited to a disk memory, CD-ROM, an optical memory, etc.) in which computer useable program codes are contained.

The above is merely embodiments of the present application, rather than limiting the present application. For those skilled in the art, various changes and variations may be made to the present application. Any modification, equivalent substitution, improvement and the like made within the spirits and principles of the present application shall all fall within the scope of the claims of the present application.

The invention claimed is:

1. A computing method of a convolutional neural network model deployed on a super-heterogeneous computing platform with different types of available computing devices, wherein the different types of available computing devices include a CPU, a GPU, an FPGA, and an AI-specific processor, wherein the convolution neural network model comprises a plurality of model layers, and the method comprises:

acquiring a computing model of a training task of a convolutional neural network model;

splitting the multiply-accumulate operation of a layer of the plurality of model layers in the computing model of the training task of the convolutional neural network model into a plurality of multiply-add operation tasks;

identifying a computing device corresponding to each multiply-add operation task from the different types of available computing devices according to a corresponding relationship between a preset computing model and a computing device, wherein the corresponding relationship is preset according to specifically customized computation implementation granularity of each of the different types of available computing devices and modified according to subsequent computing requirements; and performing computation on each multiply-add operation task of the layer of the plurality of model layers respectively by utilizing the computing device corresponding to each multiply-add operation task, so as to improve the flexibility of migration of the training task of the convolutional neural network model on the different types of available computing devices by cooperative computing and improve the computing speed thereof;

wherein the splitting the multiply-accumulate operation of the layer of the plurality of model layers in the computing model of the training task of the convolutional neural network model into a plurality of multiply-add operation tasks comprises:

splitting the multiply-accumulate operation in a computing model of a training task of the convolutional neural network model into a first-place multiply-add operation task, an intermediate multiply-add operation task, and a last-place multiply-add operation task;

wherein, the first-place multiply-add operation task comprises a multiplication computation during forward propagation computation and comprises a multiplication computation and an addition computation during backward propagation computation;

the intermediate multiply-add operation task comprises a multiplication computation and an addition computation; and the last-place multiply-add operation task comprises a multiplication computation and an addition computation during forward propagation computation and comprises a multiplication computation during backward propagation computation;

the performing computation on each multiply-add operation task of the layer of the plurality of model layers respectively by utilizing the computing device corresponding to each multiply-add operation task further comprises:

judging that a current load rate of a computing device corresponding to the multiply-add operation task is greater than a load rate threshold corresponding to a computing device corresponding to the multiply-add operation task; and calling a currently available computing device to compute the multiply-add operation task if the current load rate of a computing device corresponding to the multiply-add operation task is greater than the load rate threshold corresponding to a computing device corresponding to the multiply-add operation task.

2. The method according to claim 1, wherein, the acquiring a computing model of a training task of a convolutional neural network model comprises:

acquiring a training task of a convolutional neural network model; and processing the training task of a convolutional neural network model by utilizing a deep learning framework to generate a data flow diagram;

wherein the data flow diagram is taken as a computing model of a training task of the convolutional neural network model.

3. The method according to claim 1, further comprising the following step after splitting the multiply-accumulate operation of the layer of the plurality of model layers in the computing model of the training task of the convolutional neural network model into a plurality of multiply-add operation tasks:

adding an identifier to each multiply-add operation task;

wherein, the identifier is configured to mark the position of each multiply-add operation task in the computing model of the training task of the convolutional neural network model.

4. A non-transitory storage medium, having a computer program stored therein, wherein the computer program, when executed by a computer, causes the computer to perform the following steps:

acquiring a computing model of a training task of a convolutional neural network model deployed on a super-heterogeneous computing platform with different types of available computing devices, wherein the different types of available computing devices include a CPU, a GPU, an FPGA, and an AI-specific processor, wherein the convolution neural network model comprises a plurality of model layers;

splitting the multiply-accumulate operation of a layer of the plurality of model layers in the computing model of the training task of the convolutional neural network model into a plurality of multiply-add operation tasks;

identifying a computing device corresponding to each multiply-add operation task from the different types of available computing devices according to a corresponding relationship between a preset computing model and a computing device, wherein the corresponding relationship is preset according to specifically customized computation implementation granularity of each of the different types of available computing devices and can be modified according to subsequent computing requirements; and performing computation on each multiply-add operation task of the layer of the plurality of model layers respectively by utilizing the computing device corresponding to each multiply-add operation task, so as to improve the flexibility of migration of the training task of the convolutional neural network model on the different types of available computing devices by cooperative computing and improve the computing speed thereof;

wherein the splitting the multiply-accumulate operation of the layer of the plurality of model layers in the computing model of the training task of the convolutional neural network model into a plurality of multiply-add operation tasks comprises:

splitting the multiply-accumulate operation in a computing model of a training task of the convolutional neural network model into a first-place multiply-add operation task, an intermediate multiply-add operation task, and a last-place multiply-add operation task;

wherein, the first-place multiply-add operation task comprises a multiplication computation during forward propagation computation and comprises a multiplication computation and an addition computation during backward propagation computation;

the intermediate multiply-add operation task comprises a multiplication computation and an addition computation; and the last-place multiply-add operation task comprises a multiplication computation and an addition computation during forward propagation computation and comprises a multiplication computation during backward propagation computation;

the performing computation on each multiply-add operation task of the layer of the plurality of model layers respectively by utilizing the computing device corresponding to each multiply-add operation task further comprises:

judging that a current load rate of a computing device corresponding to the multiply-add operation task is greater than a load rate threshold corresponding to a computing device corresponding to the multiply-add operation task; and calling a currently available computing device to compute the multiply-add operation task if the current load rate of a computing device corresponding to the multiply-add operation task is greater than the load rate threshold corresponding to a computing device corresponding to the multiply-add operation task.

5. The non-transitory storage medium according to claim 4, wherein, the acquiring a computing model of a training task of a convolutional neural network model comprises:

acquiring a training task of a convolutional neural network model; and processing the training task of a convolutional neural network model by utilizing a deep learning framework to generate a data flow diagram;

wherein the data flow diagram is taken as a computing model of a training task of the convolutional neural network model.

6. The non-transitory storage medium according to claim 4, wherein, after splitting the multiply-accumulate operation of the layer of the plurality of model layers in the computing model of the training task of the convolutional neural network model into a plurality of multiply-add operation tasks, the computer is further caused to perform the following step:

adding an identifier to each multiply-add operation task;

wherein, the identifier is configured to mark the position of each multiply-add operation task in the computing model of the training task of the convolutional neural network model.

* * * * *